United States Patent [19]

Hamill

[11] 4,085,425
[45] Apr. 18, 1978

[54] PRECISE CONTROL OF TELEVISION PICTURE SIZE AND POSITION

[75] Inventor: James S. Hamill, Ormond Beach, Fla.

[73] Assignee: General Electric Company, Fairfield, Conn.

[21] Appl. No.: 690,614

[22] Filed: May 27, 1976

[51] Int. Cl.² .................. H04N 5/74; H04N 3/22
[52] U.S. Cl. ................... 358/237; 358/231; 358/180
[58] Field of Search ........... 358/180, 230, 231, 237; 352/92; 315/10, 370–371

[56] References Cited

U.S. PATENT DOCUMENTS

| 2,540,721 | 2/1951 | Fyler | 358/237 |
| 2,563,892 | 8/1951 | Waller et al. | 352/92 X |
| 3,677,627 | 7/1972 | Johnston et al. | 352/92 X |
| 3,753,612 | 8/1973 | Okey et al. | 352/92 X |

Primary Examiner—Robert L. Griffin
Assistant Examiner—Aristotelis M. Psitos
Attorney, Agent, or Firm—Allen E. Amgott; Raymond H. Quist

[57] ABSTRACT

Precise control of size and location of cathode-ray image, especially of projected image may be required for various reasons, but particularly when images from several different sources are to be matched contiguously to produce apparently continuous image, and when extreme accuracy of linear dimensions on picture is required.

Edges of image normal to each scan direction are provided with markers, such as light bars. Photosensors at edge of useful picture area sense such markers. Sum of sensings of opposed photosensors is measure of displacement of picture in direction of line joining photosensors. Difference between sensings of opposed photosensors is measure of extension or contraction of picture in that direction. Sum signal is used to control centering; difference signal is used to control scan amplitude in given direction.

5 Claims, 6 Drawing Figures

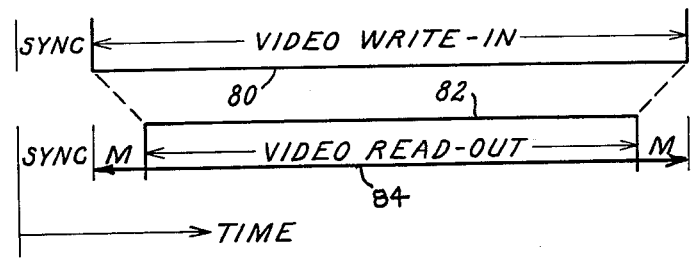
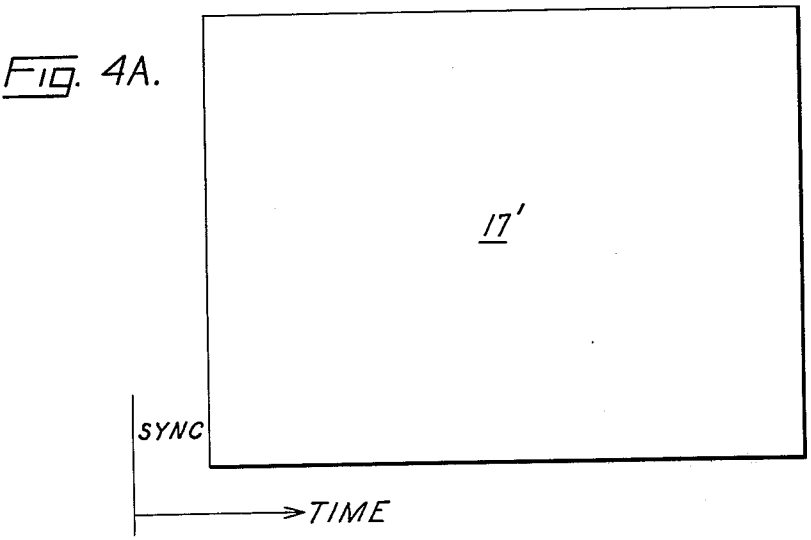
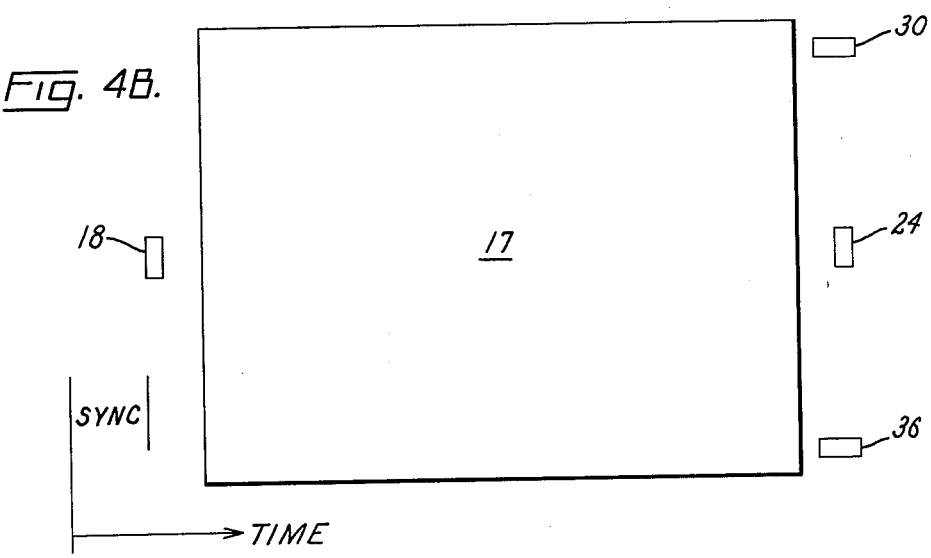

PRECISE CONTROL OF TELEVISION PICTURE SIZE AND POSITION

BACKGROUND OF THE INVENTION

1. Field of the Invention

This invention pertains to the presentation of projected images by a projection means which is scanned in at least two directions, typically a cathode-ray tube which is scanned horizontally and vertically.

2. Description of the Prior Art

Conventional television and oscilloscope technology employs fixed deflection means such as permanent magnets or direct current superimposed upon varying deflection currents, in the same winding of a deflection yoke or applied in a separate winding, to determine the central location of a beam in the absence of deflection. Alternatively, although less commonly, the central location may be determined by a fixed potential applied to electric deflection plates, either independently to separate deflection plates, or as a constant component to which varying scanning potential is applied additionally.

Varying deflection to produce scanning is provided by appropriate time-varying currents in windings on deflection yokes, or by appropriate time-varying potentials between deflection plates. The location of the picture is conventionally determined in all cases by adjustment of the fixed deflection means, and its size is conventionally determined by adjustment of the amplitude of the scanning currents or potentials. In all cases known to the applicant, constancy of location and size is determined by means to preserve the constancy of such potentials or currents at their desired values. If a projection system is used, the relation of the picture produced on the cathode-ray tube screen to its location on the projection screen is determined by the mechanically determined mutual geometric relation of the two screens and any projection optics.

When the object of projection is merely entertainment, or communication of information not directly dependent upon the accuracy of the mapping of the image upon the projection screen, such means have been found satisfactory. But the scale of a representation upon a projection (or a directly viewed) system will clearly vary with variation in picture size; for precision presentation, such variation is objectionable. Also, since the deflection of a cathode-ray beam is an angular deflection, a shift in the position of the raster may cause a shift in the relative position of the elements of the raster with respect to each other, except in the unique case where the tube face is spherical and centered with respect to a virtual center around which the beam is deflected and (in a projection system) where the optical system is such that a shift in the raster will not alter the relative position of the elements of the raster in the projected image. This stringent requirement may be relaxed by controlling the position of the raster. When pluralities of projection screens are placed contiguously to afford a simulation of a continuous picture it is clearly necessary that pictures remain as nearly fixed in position as possible to preserve the required continuity.

While it is possible to achieve high degrees of constancy in electrical deflection systems, this is always done at a cost of high quality components which remain constant with temperature variations and age, and of increased complexity of circuitry. This approach has the inherent limitation that it is essentially a predictive or, in servo terms, open-loop system; it has no inherent capacity to correct for any unforeseen variation in the system whose object is to produce a correctly located picture of proper magnitude at the projection screen.

BRIEF DESCRIPTION OF THE INVENTION

A frame of markers is provided around the picture, conveniently of light bars, for example by extending the horizontal scan slightly beyond the range required for the picture itself. This may be done by generating a positive brightness pulse at the beginning and at the end of selected horizontal sweeps to produce vertical bright bars at each side of the raster. Photosensitive transducers are located at the projection screen to receive the markers and to produce electrical signals indicative of the location of a marker with respect to its associated transducer. In theory a single photosensitive surface can be located so that a properly positioned marker will illuminate half of the surface and produce an electrical signal one-half of the maximum; and movement of the marker will increase or decrease the signal from that value. This has the disadvantage that it assumes a high degree of uniformity of the sensitivity of the photosensitive surface not only inherently as manufactured, but with age and with temperature changes. It is much more practical to employ push-pull pairs of such surfaces so located that movement of the marker will increase the illumination of one and decrease that on the other, and to connect their electrical signal outputs in opposition. Thus for the desired location of the marker, the net output of such a twin phototransducer will be zero, and for displacement it will increase in one or the other polarity, according to the direction of the marker displacement. Reference to photosensors will mean such an opposed pair of elements. However, in the present invention, pairs of such photosensors, opposed by being on opposite sides of the picture raster, each sensing the position of the marker on its side of the raster, will be described as opposed pairs of photosensors, even though each such photosensor will comprise two photosensitive surfaces or elements. Thus if the picture is of proper size, even if slightly displaced from its desired location on the screen, the two signals from the two photosensors of an opposed pair will be equal to magnitude, but different in sign; and their sum will be zero, indicating that there is no error in picture size in that dimension. If the picture size is incorrect, the two signals will differ in magnitude, with a sign depending upon the sign of the picture size error. Therefore the signal from each photosensor of an opposed pair is added to that of the other, and used to control the amplitude of the sweep in the direction of the line joining them. If the picture is displaced from its proper position (along that direction) but is of correct size, but photosensors of an opposed pair will produce signals equal in amplitude but different in sign; and their difference (which will be the sum of their absolute amplitudes, having a sign dependent upon the direction of the displacement) will indicate the magnitude of the displacement, and its sign will indicate the direction. Thus the difference between the two signals is caused to alter the centering current or potential for the direction of the line joining the two sensors.

This scheme lends itself particularly well to back projection, since the markers and the photosensor may be located on the back side of the projection screen at a frame surrounding the picture area of the projection screen. The frame then conceals the markers and the photosensors from a viewer of the front side of the screen.

The embodiment preferred by the applicant for a particular projection system employs photoresistors as sensors. The left-right markers are short strips approximately at the center line of the raster; and the up-down markers are at a side edge of the raster and are merely bright continuations of the first few and last few scan lines of the raster.

BRIEF DESCRIPTION OF THE DRAWINGS

FIG. 3 is a timing diagram representative of certain relations in the invention.

FIG. 4A is a representation of a standard television picture.

FIG. 4B is a representation of the standard television picture represented in FIG. 4A, with additions for the practice of the invention.

DESCRIPTION OF THE PREFERRED EMBODIMENT

Figure 1:
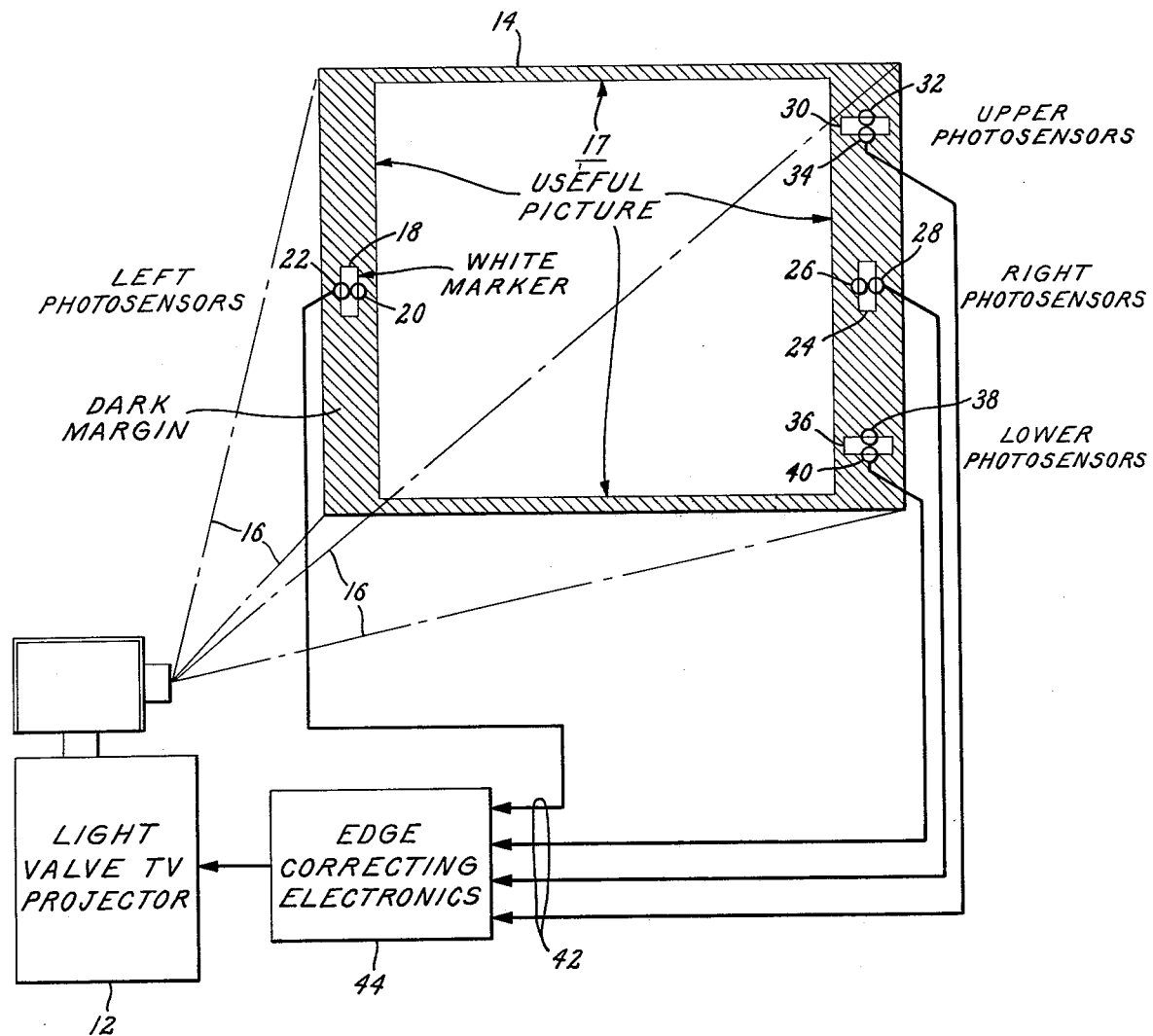
FIG. 1 represents pictorially the useful arrangement of the invention.

FIG. 1 represents schematically the elements of an embodiment of the invention. A projector 12, which in a reduction to practice was a light-valve television projector, is represented as illuminating projection screen 14 over a field bounded by lines 16, although the actually useful picture area is that designated by 17. A left marker 18 illuminates parts of dual photosensors 20 and 22, which lie side by side so that horizontal movement of left marker 18 will change the relative proportions of 20 and 22 which are illuminated. Similarly right marker 24 partly illuminates photosensors 26 and 28, which lie side by side. Correspondingly, in the vertical direction, upper marker 30 partly illuminates photosensors 32 and 34, and lower marker 36 partly illuminates photosensors 38 and 40. It is evident that the latter markers 30 and 36 are not stripes lying above and below the raster, but rather are formed in extensions of raster lines near (but not necessarily at) the top and bottom of the picture. Signal channels 42 extend from the various photosensors to a symbolic rectangle labeled "Edge Correcting Electronics", 44, which is represented as feeding signals into the base of projector 12.

Figure 2:
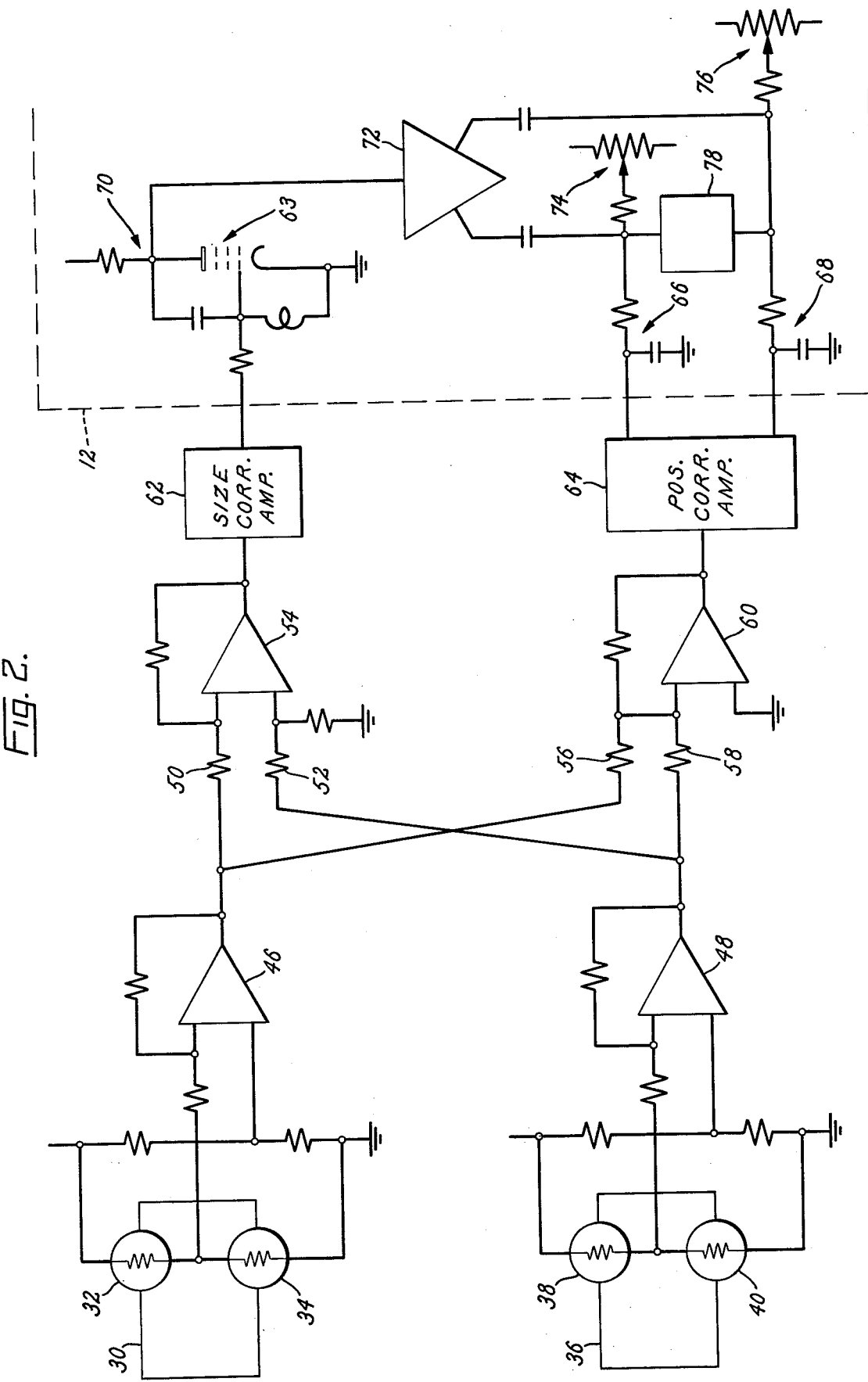
FIG. 2 represents schematically circuitry for the practice of the invention.

FIG. 2 represents schematically photosensors 32 and 34, with their resistive elements in series with a constant potential applied across them, and their center tap or common junction tied to a conventionally represented operational amplifier 46 input, whose return input terminal is returned to approximately the potential of the common junction by a potential divider resistive network. Strictly similarly, the common junction of series-connected photosensors 38 and 40 is connected to the input of amplifier 48. The outputs of amplifiers 46 and 48 are tied, through isolating resistors 50 and 52, to opposite terminals of differential amplifier 54 and through isolating resistors 56 and 58 to the same terminal of amplifier 60. The resistances of the isolating resistors are chosen to place the interconnected amplifiers upon suitable parts of their operating characteristics, away from saturation or cut-off. The isolating resistors thus function also as signal proportioning resistors.

An upward movement of marker 30 and a downward movement of marker 36 will produce signals of opposite sign, from their respective amplifiers 46 and 48, so that the difference between the two amplifier outputs will be a measure of the vertical expansion of the raster. A downward movement of marker 30 and an upward movement of marker 36 will produce signals of opposite sign from their respective amplifiers, but they will be the negative of the signals in the preceding case; their difference will therefore be a measure of the vertical contraction of the raster, but will differ in sign from the measure of vertical expansion. The output of amplifier 54, which is proportional to the differences of outputs of amplifiers 46 and 48, and different in sign for expansion and contraction of the raster, is indicative of change in size of the raster. It is therefore connected to size corrector amplifier 62, which is represented as connected to a control grid of the pentode 63 used in the vertical sweep generator which is part of projector 12. If the raster is expanding, the output of size corrector amplifier 62 is of proper sign to cut down the amplitude of the vertical sweep; conversely if the raster is contracting. We have here simply a standard feedback stabilization system so far as the effect of the connections is concerned, despite the novelty of the component combination and useful object achieved.

If marker 30 moves upward and marker 38 moves upward, the amplifiers 46 and 48 will produce signals alike in sign and (within the limits of identity of the system characteristics) alike in amplitude. The sum of these signals is therefore a measure of the upward displacement of the raster. Hence the output of amplifier 60 measures the error in vertical position of the raster. It is connected to position corrector amplifier 64, which is a phase inverter push-pull amplifier whose output is connected through isolating filters 66 and 68 to the vertical deflection plates in the projector 12.

It is evident that there are numerous practical possibilities of accidental sign inversion in the system; for example, if the locations of photosensors 32 and 34 were interchanged, the sign of the output of amplifier 46 would be reversed so that adding it to the output of amplifier 48 would produce a measure of the raster size error, and subtracting it from the output of amplifier 48 would produce a measure of the raster location error—precisely the reverse of the situation presently existing. It is well within very elementary skill in the art to determine which amplifier of 54 and 60 produces which significance of signal; if connecting amplifier 54 to amplifier 62 and amplifier 60 to amplifier 64 does not produce the required stabilization of raster size and location, the connections should be reversed.

For compliance with formal description requirements, it is recited that 70 is a sweep generator, 72 a sweep amplifier (also, obviously, generally phase-inverting push-pull), 74 and 76 are conventional voltage divider networks for initial positioning of the beam, and 78 are conventional deflection plates. Similar circuitry in which 30, 34, 32, 36, 38, and 40 are replaced by 18, 20, 22, 24, 26, and 28, respectively, and connection is made to horizontal deflection plates instead of vertical will provide horizontal positioning and size control. This and the circuitry represented in FIG. 2 will constitute the content of edge correcting electronics 44 of FIG. 1.

The known art encompasses the possibility of numerous variations of the basic principle of my invention, particularly in the manner of generating the boundary markers of the raster. The present invention was motivated by a problem arising in a high-definition light valve projection system employing a refractive optical system. Several details of embodiment are desirable or necessary for such use. The total portion of the optical field which is adequately flat and otherwise correct may be used for the picture since slight distortion will not injure the utility of the boundary markers. For the light valve system the picture elements which are controllably luminous will exist only on the projection screen, but for a cathode-ray system with luminescent screen they may be found either at the tube face or on a projection screen if one is used. It is generally preferable to locate the photosensors at or near the projection screen, since the longer optical lever will yield greater sensitivity to displacements.

The particular projection means employed in the first reduction to practice happened to employ electric, rather than magnetic, deflection but this feature is not preferred to more conventional magnetic deflection; the preferred feature is whatever is required by the projection means.

It may appear at first impression that the generation of the markers can be effected in one of two general ways; first, that the scan amplitude may be altered for the beginning and the end of the raster—usually the horizontal scan amplitude would be increased at the beginning and the end of the vertical sweep, with brightening of the screen at the regions of increased amplitude. But this would stretch out and distort the picture in those lines, and be most complex. I prefer using at all times a scan amplitude which encompasses the picture raster whose individual picture elements (whether of a luminescent screen or on a projection screen) form the picture, and additionally encompasses the amplitude required for the markers. It must be recognized that either of these schemes will create timing problems if the picture being reproduced arrives from an external source using conventional scanning as in standard television (locally generated video signals may, of course, be produced with compatible timing). A so-called scan converter may be employed, in which the incoming video signal is stored at its normal speed and frequency, and may be read out at a locally determined speed frequency and time. The problem is that it is preferable to retain the vertical and horizontal scan frequencies of the incoming video signal; but if this is done, and a part of the beginning and a part of the end of each line is used for the marker area, the time remaining in the central part of the line will be less than the duration of the video line as it arrives. If the beginning and end of the picture line may be discarded without objection, there is of course no problem; but if the whole picture is to be preserved, the reading out of the video must begin slightly late, and be finished slightly early, so that the whole line of video is read out between the marker areas. The scan converter permits this; it could even be employed to correct for the use of the first method in which only selected lines are stretched to provide room for the markers; but this would be much more complex than my preferred method.

FIG. 3 is a time comparison diagram in which the time axis extends horizontally to the left. Line 80 represents a conventional television line signal with the synchronizing signal preceding the video proper. (For simplicity black and white is assumed.) The portion of line 80 representing the video is further marked "write-in" to indicate that this part of the video signal is written into the scan converter (FIG. 5) during the indicated interval. Line 82, marked "video read-out" represents the shorter time interval over which the video signal must be read out of the scan converter; and line 84 represents the time distribution in the reproduced video, with intervals marked "M" to signify a time interval in which the markers must be generated. It is emphasized that FIG. 3 represents merely relative time intervals, and not time of occurrence of the indicated events; for if it did profess to do so, it would be implying the possibility of reading out at the end of "video read-out" information which had not yet been written at the end of "video write-in"—a magical operation not in a statutorily patentable class. FIGS. 4A and 4B represent the picture area 17' as received (4A) and as projected 17(4B) with marker 18 occurring in the interval corresponding to the first M of FIG. 3, then the picture 17 beginning later in time than 17' does in 4A, and extending the same spatial distance as 17', being then followed by markers 24, 30 and 36 in the area corresponding to the second "M" of FIG. 3. But this is a geometric representation, not directly of time relations. The horizontal scan in 4B is of greater amplitude than in 4A, but of the same time duration; the end of markers 24, 30, or 36 will occur at the same time as the end of the video lines in 17' of 4A. The apparatus for overcoming the various problems here described is represented schematically in FIG. 5.

Incoming standard television signal similar to 80 of FIG. 3 is applied to terminal 86, which is connected to a synchronizing signal separator 88, which passes the video content of the signal to analogue/digital converter 90. The horizontal synchronizing signal extracted by 88 is fed to reset to zero standard address counter 92, which addresses the read-in terminals of scan converter 94, causing the dititized video output of 90 to be read into 94. Standard address counter 92 preferably counts at a rate corresponding to the rate of arrival of picture elements. It is pulsed at such a rate by the output of clock 96, counted down by count-down 98. But the purpose of scan converter 94 is to permit reading out of a line of video at a rate higher than the standard rate at which it arrives. Fast address counter 100 (which is connected to address the read-out terminals of scan converter 94) must count at a faster rate than 92; so it is pulsed by its own count-down 102 from clock 96, at a rate which will cause it, in the length of time indicated by "video-read out" 82 of FIG. 3, to count as many pulses as counter 92 in the length of time indicated by "video-write in" 80 of FIG. 3. The rate of clock 96 will be the least common multiple of these two rates so that integral count-down can produce both frequencies. When counter 100 addresses scan converter 94, the output of 94 passes to digital/analogue converter 104 emerging, ideally at least, as a delayed but faster version of the original video signal entering at terminal 86. The total read-out cycle of 94 performed by 100 must occur at the standard line repetition rate; so 100 is connected to receive the horizontal synchronizing signal from 88. But if it is to read out only after the video signal has been written in, it must begin later by a period equivalent to twice the interval M of FIG. 3. If delay 106 is therefore inserted in the line from 88 to delay the horizontal synchronizing signal by 2M, it is evident that there will be time for all the video arriving at terminal 86 to be written into scan converter 94 at the standard rate of standard address counter 92 before it is read out by fast address counter 100, and that the fast reading out will be proper to squeeze the picture 17 between the markers (FIG. 4B). But (as appears infra) it is convenient to use fast address counter 100 to help generate marker 18; for this purpose it should begin operating with a delay of only M, but not begin reading out video from 94 until a further delay of M. Delay 106 is therefore actually made to delay only a period of M, so that fast counter 100 will be counting for the additional period of M before it must read out of 94. This may be achieved in two equivalent ways. By the first, the read-out address scheme of scan converter 94 may be modified so that it begins its sequence, not with a value of unity, but with whatever the count of 100 may be at the end of the period M. By the second scheme, the delayed synchronizing pulse resets 100 not to zero, but to a value near its maximum registration of such magnitude that it will come to zero just at the end of a time M after being synchronized. Since the horizontal scan to produce the pattern represented in FIG. 4B must begin an interval of M before the video read-out begins, the horizontal synchronizing pulse to horizontal sweep generator 108 (for use in the local projector system) should also be delayed by M, and so 106 is located to delay the separated horizontal synchronizing pulse from 88 for 108 also.

Markers 18, 24, 30 and 36 are generated by a read-out memory 110 which receives the reading of 100 and of line counter 112, and generates appropriate brightness signals when 100 indicates a horizontal element lying within a marker if the line number is correct, and counter 112 indicates that the vertical deflection, or line number, is indeed correct. The output of 110 is represented as fed through a digital-analogue converter 114 to buffer 116, which produces at terminal 118 a brightness signal which is a mixture of the video signal and the marker signal, and may be applied to the brightness control of the projector to produce the pattern represented by FIG. 4B. Since the vertical deflection frequency of the projected picture is to be the same as that of the incoming standard television signal at terminal 86, vertical sweep generator 120 receives the vertical sync pulse separated by 88, delayed by 122 for a period M so that it will be properly timed with respect to 108, for use in the local projector system; the respective sweep outputs appear at terminals 124 and 126.

Since the vertical deflection is at the standard frequency, and the fast read-out is confined to the individual lines, line counter 112 may be clocked by further countdown from count-down 98, which clocks standard address counter 92; count-down 128 serves this purpose. Because all counters are clocked from clock 96 by counting down, all the counters will remain in synchronism during successive frames.

The specific preferred embodiment which has been described is representative of a more general range of embodiments, and requires generalized description. The projector 12 is typical of a picture presentation device (in which the term "picture" may include any graphic matter such as a chart or a map) which is scanned in a picture raster by horizontal scanning means at a horizontal scanning frequency, and by vertical scanning means at a vertical scanning frequency. When, as in FIG. 4B, the scan extends outside of the picture area 17, the term "picture" will be used to mean only the picture area. In the embodiment described an electron beam which is scanned operates to alter the light-transmissive properties of the light valve. But such a beam may equally well impinge upon a luminescent screen whose illumination may be viewed directly, or projected through an optical system to a projection screen. If it were desirable in some particular application to scan a beam of ultra-violet light by optical means upon a luminescent screen to form an image, the principles of my invention would still be applicable to such a device. The generic description of the scanned entity, which is commonly the electron beam as disclosed in the preferred embodiment is therefore a stimulus, controllable to cause individual picture elements to be controllably luminous responsively to the stimulus. The picture elements may appear on a luminescent screen directly viewed, or they map appear on a projection screen—indeed, in the case of a light valve projector, they will not appear anywhere else. The location of the entire picture, which the amplifier 60 and its associated chain of equipment is intended to maintain constant, and which is controllable initially by resistive networks 74 and 76, may be described as the mean position of the picture.

The preceding definition is still somewhat limited. Certain presentations—for example, of a limited number of stars for navigational teaching, or some similarly restricted number of essentially point objects—may economically be presented by storing their coordinates and intensities or luminosities and presenting them in the order in which they are stored, without scanning an entire field. If this be done with a device such as a cathode-ray tube, control of the mean position of the display or picture will be possible by the usual centering controls, and control of the boundaries of the display will be a size control, and may be simply an adjustment of the scale factor between the coordinates and the actual deflections in the display. The most general description must apparently be of a picture presentation device in which the mean position of the picture and its size are controllable.

Marker areas 18 and 24, and 30 and 36 are illuminated marker areas outside of the raster and even though they are not exactly at the boundaries of the raster, they are sufficiently close to those boundaries to be indicative of them. Photoresistors such as 32 and 34 are generically photosensitive transducing means located to receive the illumination from the illuminated marker areas; and, through associated amplifiers such as 46, they produce a signal which is indicative of the location of the illuminated marker area with respect to the transducing means.

Figure 5:
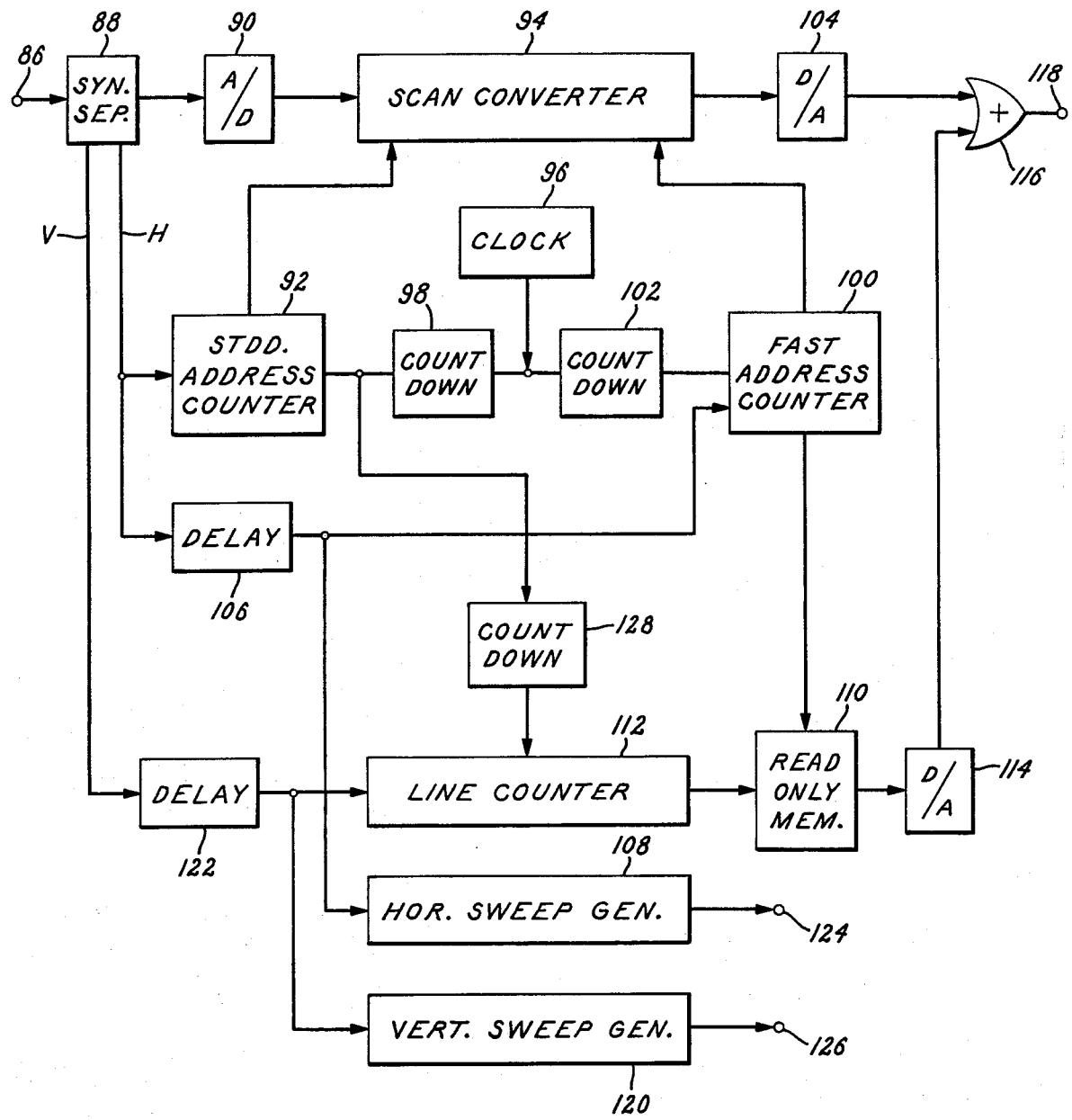
FIG. 5 represents schematically circuitry for the practice of the invention in the presentation of a standard television signal.

Amplifier 54 is a means to combine two such electrical signals in a first way to produce a signal indicative of the distance between the marker areas, and amplifier 60 is a means to combine two such electrical signals in a second way to produce a signal indicative of the means displacement of the marker areas. FIG. 1 discloses an embodiment in which the picture elements are on a projection screen, and the photosensitive transducing means are in immediate proximity to the projection screen; and it has been mentioned that a light transmissive projection screen may be used for so-called back projection, the image being projected upon one side of the screen and viewed from the other. Terminal 86 of FIG. 5 is a means to receive television signals which, as represented by 80 of FIG. 3, comprise a synchronizing signal and a line video signal, having a fixed horizontal line repetition rate and a given duration of the line video signal. Scan converter 94 and its auxiliaries is a means to store the line video signal, and the detailed description of the other auxiliaries of FIG. 5 details the generation of marker signals of predetermined duration, and the reading out of the stored line video signal in a time which is less than its duration, prior to storage by at least the duration of the marker signals—a relation made clear by FIG. 3 and its explanation. Terminal 118 is a means to apply the marker signals and the read-out stored line video signal to the picture presentation device; and terminal 124 is a means to permit its presentation at the horizontal repetition rate of the received signals.

I claim:

1. In a scanned picture presentation device in which the horizontal size of the picture is controllable by horizontal scan size means and the mean horizontal position of the picture is controllable by horizontal scan positioning means, the improvement comprising:
   a. means to produce illuminated marker areas outside of the picture indicative of the left and right boundaries of the picture;
   b. a plurality of photosensitive transducing means located to receive the illumination from the illuminated marker areas and responsively thereto to produce electrical signals representative of the locations of the illuminated marker areas with respect to the said transducing means;
   c. means to combine the signals from transducing means receiving illumination from the marker area indicative of the left boundary of the picture and from transducing means receiving illumination from the marker area indicative of the right boundary of the picture in a first sense to produce a signal indicative of the distance between the said marker areas, and to apply it operatively to cause the horizontal scan size means to reduce the horizontal scan size of the picture responsively to an indication of an increase in the said distance and to increase the horizontal scan size of the picture responsively to an indication of a decrease in the said distance;
   d. means to combine the signals from transducing means receiving illumination from the marker area indicative of the left boundary of the picture and from transducing means receiving illumination from the marker area indicative of the right boundary of the picture in a second sense to produce a signal indicative of the mean horizontal displacement of the said marker areas, and to apply it operatively to the said horizontal scan positioning means to move the picture leftward responsively to a signal indicative of a mean rightward displacement of the said marker areas and to move the picture rightward responsively to a signal indicative of a mean leftward displacement of the said marker areas.

2. The improvement claimed in claim 1 in which the vertical size of the picture produced by the said scanned picture presentation device is controllable by vertical scan size means and the mean vertical position of the picture is controllable by vertical scan positioning means, the improvement further comprising:
   a. means to produce illuminated marker areas outside of the picture indicative of the upper and lower boundaries of the picture;
   b. a plurality of photosensitive transducing means located to receive the illumination from the illuminated marker areas and responsively thereto to produce an electrical signal representative of the locations of the illuminated marker areas with respect to the said transducing means;
   c. means to combine the signals from transducing means receiving illumination from the marker area indicative of the upper boundary of the picture and from transducing means receiving illumination from the marker area indicative of the lower boundary of the picture in a first sense to produce a signal indicative of the distance between the said marker areas, and to apply it operatively to cause the vertical scan size means to reduce the vertical scan size of the picture responsively to an indication of an increase in the said distance and to increase the vertical scan size of the picture responsively to an indication of a decrease in the said distance;
   d. means to combine the signals from transducing means receiving illumination from the marker area indicative of the upper boundary of the picture and from transducing means receiving illumination from the marker area indicative of the lower boundary of the picture in a second sense to produce a signal indicative of the mean vertical displacement of the said marker areas, and to apply it operatively to the said scan positioning means to elevate the picture responsively to a signal indicative of a mean downward displacement of the said marker areas and to lower the picture responsively to a signal indicative of a mean upward displacement of the said marker areas.

3. The improvement claimed in claim 1 in which the picture is presented by projection on a projection screen, and the therein said photosensitive transducing means are in immediate proximity to the projection screen.

4. The improvement claimed in claim 3 in which the said projection screen is light transmissive so that the picture may be viewed on that side of the projection screen which is farther from the said photosensitive transducing means.

5. The improvement claimed in claim 1, further comprising:
   a. means to receive television signals comprising a synchronizing signal at a horizontal line repetition rate and a line video signal having a line video signal duration;
   b. means to store the line video signal;
   c. means to generate marker signals of predetermined duration and nonsimultaneously therewith to read out the stored line video signal in a time which is less than its duration prior to storage by at least the duration of the said marker signals;
   d. means to apply the marker signals and the read-out stored line video signal to the picture presentation device to be presented at the horizontal line repetition rate of the received television signals.

* * * * *